US008322944B2

(12) United States Patent
Hodgekins et al.

(10) Patent No.: US 8,322,944 B2
(45) Date of Patent: Dec. 4, 2012

(54) TRENCH DRAIN WITH SLOPING RAILS

(75) Inventors: Barry J. Hodgekins, LaPorte, IN (US);
Craig Swider, Long Beach, IN (US);
Jason Jacobs, Chesterton, IN (US);
Peter Lenk, Aichach (DE); Wolfgang Strandl, Aichach (DE); Brian Tubaugh, Westville, IN (US)

(73) Assignee: Josam Company, Philadelphia, PA (US)

(*) Notice: Subject to any disclaimer, the term of this patent is extended or adjusted under 35 U.S.C. 154(b) by 365 days.

(21) Appl. No.: 12/258,232

(22) Filed: Oct. 24, 2008

(65) Prior Publication Data
US 2009/0103982 A1 Apr. 23, 2009

Related U.S. Application Data

(63) Continuation-in-part of application No. 11/762,769, filed on Jun. 13, 2007, now Pat. No. 7,736,092.

(60) Provisional application No. 60/813,731, filed on Jun. 13, 2006.

(51) Int. Cl.
*E02B 5/02* (2006.01)
*E01C 11/22* (2006.01)
(52) U.S. Cl. .......................................... 404/2; 405/118
(58) Field of Classification Search .......... 405/118–119, 405/121–123; 404/2–5; 249/10–11
See application file for complete search history.

(56) References Cited

U.S. PATENT DOCUMENTS

| 1,584,756 | A | | 5/1926 | Dougherty |
| 3,888,712 | A | | 6/1975 | Akiyoshi et al. |
| 4,472,078 | A | | 9/1984 | Karbstein |
| 4,751,945 | A | * | 6/1988 | Williams ...................... 138/117 |
| 4,878,782 | A | | 11/1989 | Beattie et al. |
| 5,026,202 | A | | 6/1991 | Thomann |
| 5,213,438 | A | * | 5/1993 | Barenwald ........................ 404/2 |
| 5,226,748 | A | | 7/1993 | Barenwald et al. |
| 5,466,091 | A | * | 11/1995 | Sauerwein et al. ............. 405/36 |
| 7,048,466 | B2 | | 5/2006 | Benesteau et al. |
| 2007/0293008 | A1 | | 12/2007 | Hodgekins et al. |
| 2009/0097921 | A1 | * | 4/2009 | Hetzler et al. ................ 405/119 |
| 2010/0018128 | A1 | | 1/2010 | Strandi et al. |

OTHER PUBLICATIONS

International Search Report and Written Opinion mailed Dec. 19, 2008 in the corresponding PCT Application No. PCT/US08/81194.
International Search Report and Written Opinion for PCT Application No. PCT/US07/13957, mailed on Jul. 30, 2008, 6 pp.
Declaration of Barry J. Hodgekins, Dec. 5, 2008.
Declaration of Robert A. Green, Dec. 17, 2008.

* cited by examiner

*Primary Examiner* — Sunil Singh
(74) *Attorney, Agent, or Firm* — Christie, Parker & Hale, LLP

(57) ABSTRACT

A modular trench drain system with sloping overlay rails. A non-sloping section of trench drain is transformed into a sloping trench drain by installing sloping overlay rails. The overlay rails rest on the top of the upper edge of the sidewalls and may have a ledge which allows grating, which spans across the channel, to rest on top. The modular channel sections may be held together and in place by a channel bracket with holes for accepting support rods which further secure the channels in place before and after the concrete has been poured and cured around the channels.

28 Claims, 14 Drawing Sheets

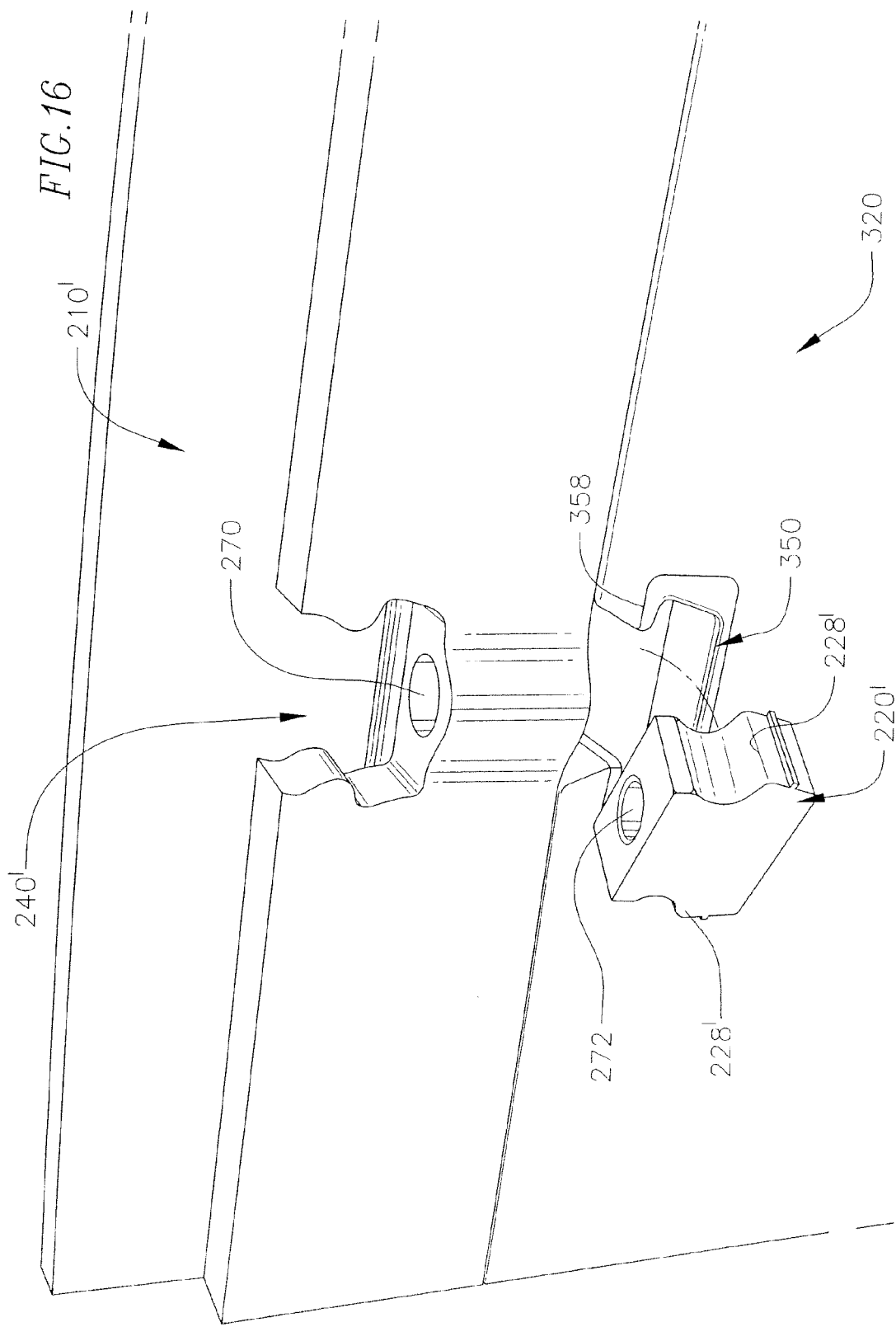

TRENCH DRAIN WITH SLOPING RAILS

CROSS-REFERENCE TO RELATED APPLICATION(S)

This application is a continuation-in-part of U.S. patent application Ser. No. 11/762,769, filed Jun. 13, 2007, now U.S. Pat. No. 7,736,092, which claims the benefit of U.S. provisional patent application No. 60/813,731, filed Jun. 13, 2006, the disclosures of both of which are hereby incorporated by reference in their entirety for all purposes.

FIELD OF THE INVENTION

The present invention relates to a trench drain for collection of liquid runoff, and more particularly to a trench drain system with sloping rails.

BACKGROUND

The general concept of trench drains is well known in the prior art. Trench drains are generally used to transport large amounts of liquid from one location to another. Typically, trench drains are used to collect liquid runoff from residential and commercial structures and deliver the runoff to a sewer system.

Current trench drains are typically modular in design and constructed of various materials. Typically, the trench drains consist of channels that have two sidewalls separated by a bottom wall. To install the trench drains, a trench is typically dug to a depth twice as deep as the height of the sidewalls, such that the top of the sidewall is about ⅛" below the surrounding surface. Modular trench drain pieces, typically in about 1 meter lengths, are connected and sealed together. Concrete is poured in the bottom of the trench, the connected trench drain pieces are placed on top, and then concrete is poured around the trench drain up to a height approximately equal to the sidewall.

Because the top of a trench drain remains level, the slope is typically built into the channel itself. To accomplish this, each section of trench drain, as the drain slopes down, has higher sidewalls than the prior, adjacent section of trench drain. Thus, many different molds are needed to cast and form each section of the sloping trench drain. Suppliers will also need to keep a supply of each different section of sloping channel.

SUMMARY OF THE INVENTION

In one embodiment of the invention, a modular, non-sloping section of trench drain is transformed into a sloping section of trench drain by installing sloping overlay rails. The overlay rails rest on the top of the upper edge of the sidewalls.

In another embodiment, the sloping overlay rails have a ledge which allows grating, which spans across the channel, to rest on top.

In yet another embodiment, the channels are held together and in place by a channel bracket with a hole(s) for accepting a support rod, typically rebar, to further secure the channel in place before and after the concrete has cured.

In one embodiment, an overlay rail for a trench drain channel includes a proximal end and a distal end, a top edge and a bottom edge, an inside surface and an outside surface, and a channel engagement portion. The channel engagement portion has alternating first and second engagement portions spaced apart from each other a distance sufficient to receive such channel between the first and second engagement portions. The height of the rail from the top edge to the bottom edge increases from the distal end to the proximal end.

In another embodiment, a trench drain system includes a channel having first and second sidewalls, and first and second overlay rails. Each rail includes a top edge and a bottom edge, and a proximal end and a distal end, and the height of the rail between the top edge and the bottom edge slopes from the proximal end to the distal end. The rail also includes an inner engagement portion engaging an inside surface of the upper wall, and an outer engagement portion spaced apart from the inner engagement portion and engaging an outside surface of the upper wall. A portion of each sidewall is received between the inner and outer engagement portions to attach the rail to the channel. The inner and outer engagement portions are staggered.

In one embodiment, a method of manufacturing a sloping overlay rail includes providing a section of glass-fiber reinforced polyester, and moving the section into a press. The press is shaped to form an overlay rail having a proximal end and a distal end, and a top edge and a bottom edge. The height of the rail from the top edge to the bottom edge slopes from the distal end to the proximal end. The rail also has an inside surface and an outside surface, and a channel engagement portion including first and second staggered engagement portions. The method also includes pressing the section of material under high heat and high pressure.

BRIEF DESCRIPTION OF THE DRAWINGS

FIG. 4A is an overhead perspective view of the overlay rails according to one embodiment of the invention.

FIG. 16 is a perspective view of a sloping overlay rail and channel according to another embodiment of the invention.

DETAILED DESCRIPTION

In one embodiment of the invention, a modular, non-sloping section of trench drain is transformed into a sloping section of trench drain by installing sloping overlay rails.

Figure 1:
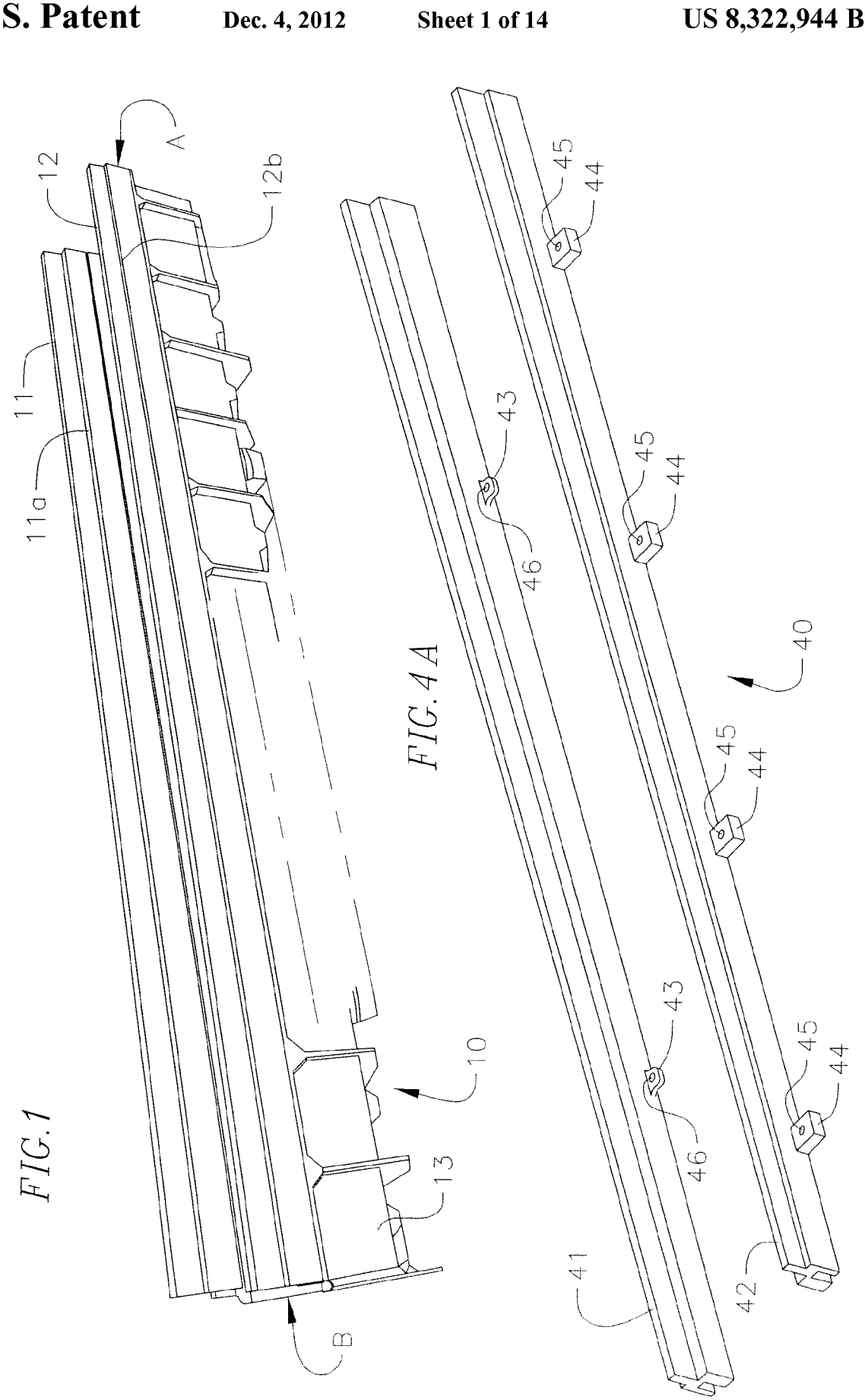
FIG. 1 is a side perspective view of a trench drain with sloping overlay rails according to one embodiment of the invention.
Figure 2:
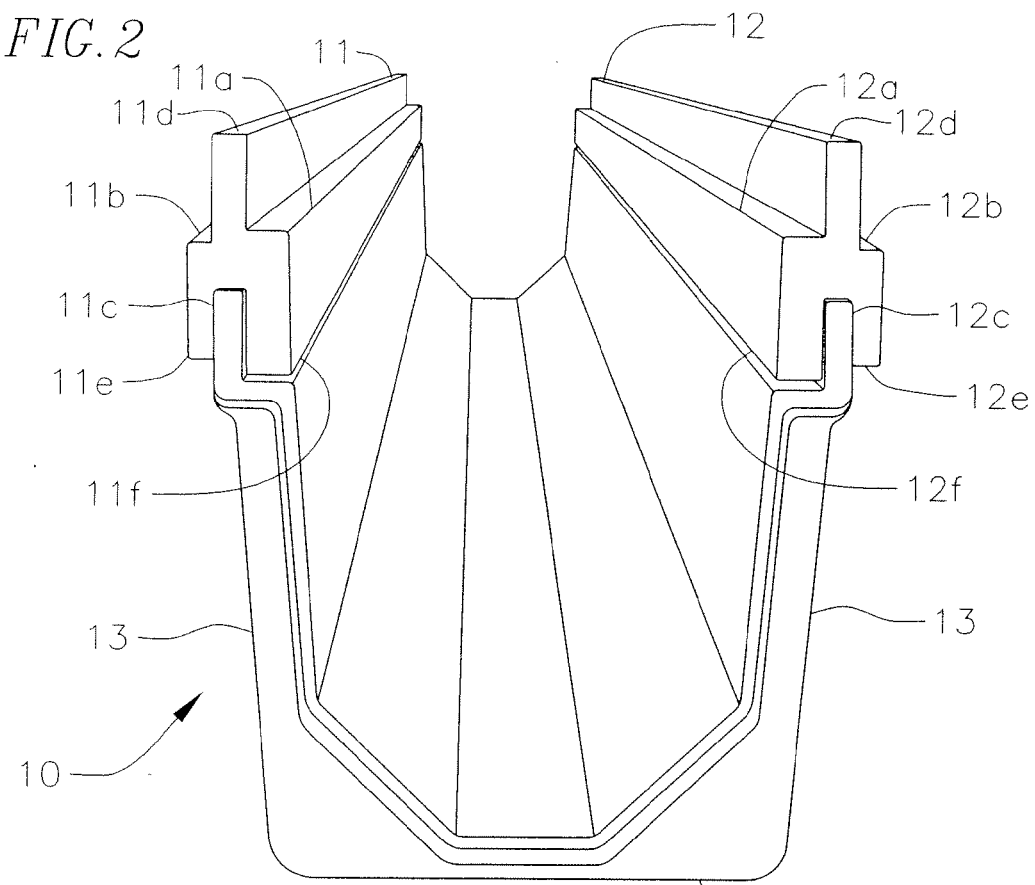
FIG. 2 is an end view of a trench drain with sloping overlay rails according to one embodiment of the invention.
Figure 3:
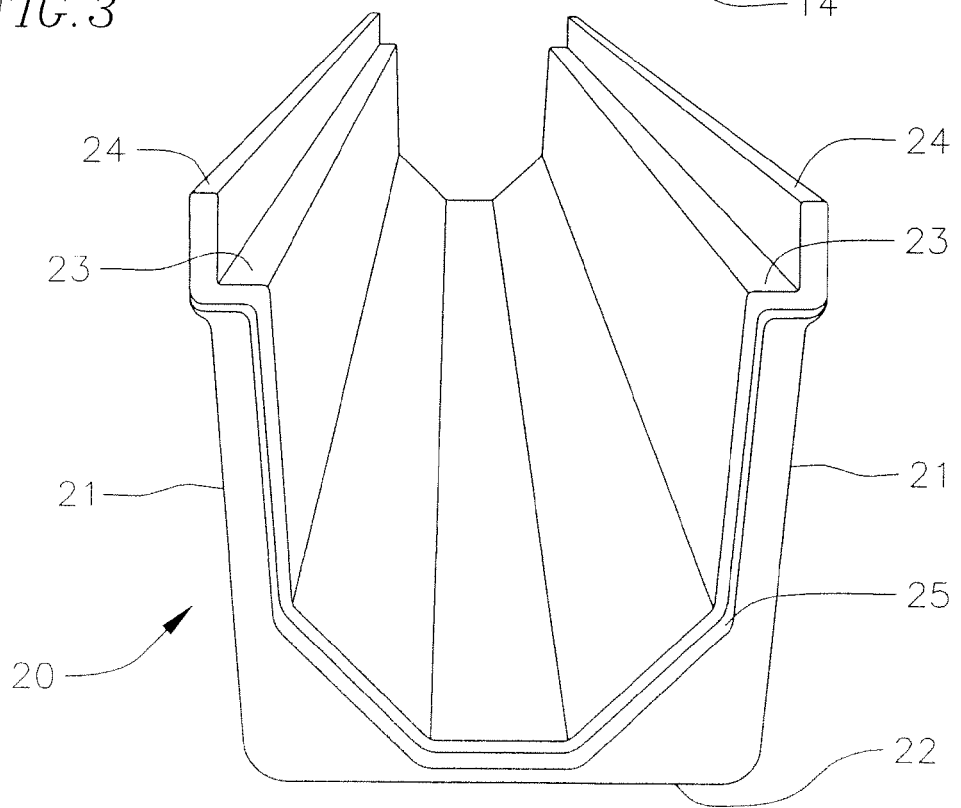
FIG. 3 is a trench drain channel without sloping overlay rails according to one embodiment of the invention.

According to an embodiment of the invention, as shown in FIG. 1, sloping overlay rails 11, 12 are mounted on a non-sloping, modular trench drain component 13 to create a sloping trench drain 10. As shown in FIG. 3, the non-sloping modular trench drain component 20, comprises sidewalls 21 and a bottom section 22. Each sidewall 21 has an upper edge 24 and an inner shelf 23 below the upper edge 24. There is also a flange with a groove 25 at one end of the modular trench drain component 20, which flange may correspond to a "female" end and is dimensioned and adapted to receive a corresponding "male" end. The other end of the trench drain component 20, the "male" end (not shown), is dimensioned and adapted be inserted into the "female" end, to make a tight fitting joint. In an embodiment, the joint is held together with an adhesive and is watertight. The bottom of each overlay rail 11, 12 has an inverted U-shaped groove. As shown in FIG. 2, each overlay rail 11, 12 comprises an inner ledge 11a, 12a respectively, and an outer ledge 11b, 12b respectively. As shown in FIGS. 2 and 3, the bottom of the inner ledge 11f, 12f rests on the top of the inner shelf 23 of the non-sloping modular trench drain component 20.

Figure 5:
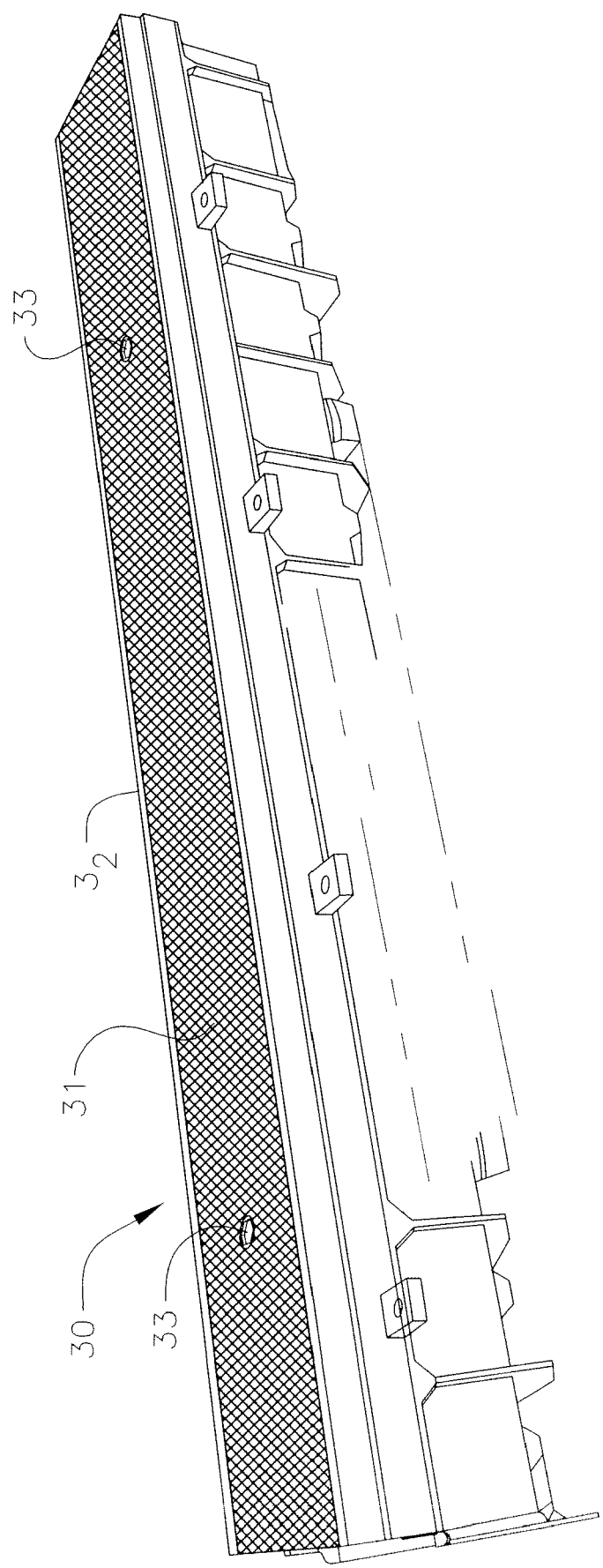
FIG. 5 is a side perspective view of a trench drain with sloping overlay rails and installed grating according to one embodiment of the invention.

In another embodiment, the vertical distance from the inner ledge 11a, 12a, to the top of the overlay rail 11d, 12d is constant throughout the length of the overlay rail 11, 12. As shown in FIG. 5, this allows grating 31 that is level with the top rail 32 to be installed on the sloping trench drain 30.

In an additional embodiment, as shown in FIGS. 1 and 2, the vertical distance from 11a, 12a to 11f, 12f increases linearly from end A to end B, thereby creating the sloped trench drain 10. For the outside of the overlay rail 11, 12 the vertical distance from the top of the rail 11d, 12d to the outer ledge 11b, 12b increases as the slope increases, and the distance from the outer ledge 11b, 12b to the bottom of the outer leg 11e, 12e is constant. In one embodiment the rail increases in height at a constant rate between 0.50% and 1.00%, and in another embodiment it increases in height at a constant rate of about 0.75%. Thus, for a 1 meter section of trench drain having rails that increase in height at a rate of 0.75%, the increase from end A to end B would be about 0.0075 meters or about 0.295 inches. In another embodiment, fifteen different 1 meter sections of trench drain are connected together with sloping overlay rails having a 0.75% rate of increase in height, yielding a height differential of 0.1125 meters or 4.425 inches between the beginning of the first section and end of the last section. In one embodiment, the overlay rails are 1 mm shorter than the channel section to allow for some linear expansion, although a larger or smaller gap may be used.

Figure 4B:
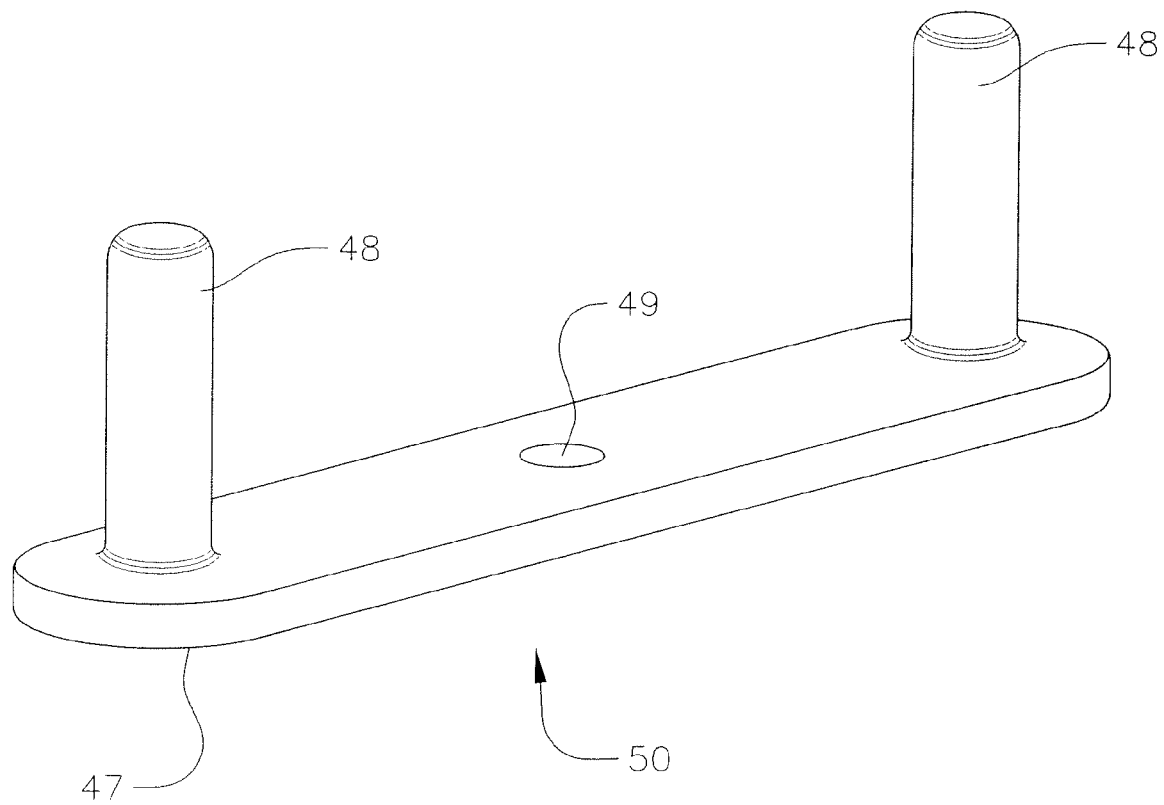
FIG. 4B is an overhead perspective view of an anchor clip according to one embodiment of the invention.

According to one embodiment, as shown in FIG. 4A, each rail 41, 42 in the matched pair 40 is a mirror image of the other. Each section of trench channel will require a different matched pair of overlay rails to create continuously sloping trench drain system. The height at the end of the overlay rail of the previous section of trench drain should correspond to the beginning height of the overlay rail of the next section of trench drain, so as to make a continuously sloping trench drain system. In another embodiment, the outside edge of each rail 41, 42 contains four anchor lugs 44, with center openings 45. Each rail 41, 42 may contain more or less than four anchor lugs 44. The lugs 44 enhance positive anchoring during the concrete pour and the center the allows attachment of wire mesh (not shown) prior to the concrete pour. In yet another embodiment, the inside edge of each rail 41, 42 contains two anchoring tabs 43 with a center hole 46. Each rail 41, 42 may contain more or less than two anchoring tabs 43. In one embodiment, an anchoring clip 50, as shown in FIG. 4B is inserted into an anchoring tab center hole 46 on a rail 41 and a corresponding center hole 46 on the opposite rail 42. The anchoring clip 50 assists in maintaining a constant distance between the two rails 41, 42. Thus, neither pressure exerted inward from poured concrete, nor pressure exerted outward from the molded draft of the modular channel will significantly change the upper span between the rails 41, 42.

In an embodiment, as shown in FIG. 4B, the anchoring clip 50 comprises a top 47 plate with two pins 48, and a center hole 49. In one embodiment, the distance between the two pins 48 corresponds to the distance between the anchor tab center holes 46, opposite each other on rails 41, 42. In yet another embodiment, the center hole 49 is used for a grate locking device and lines up with bolt holes 33 in the grating 31 as shown in FIG. 5. In one embodiment, the anchoring clip 50 is inserted into corresponding holes 46 with the pins facing down. If it is desired to use a grating lock device, the anchoring clip 50 may be inserted with the pins facing up as discussed below with reference to FIGS. 10A-D.

Figure 6:
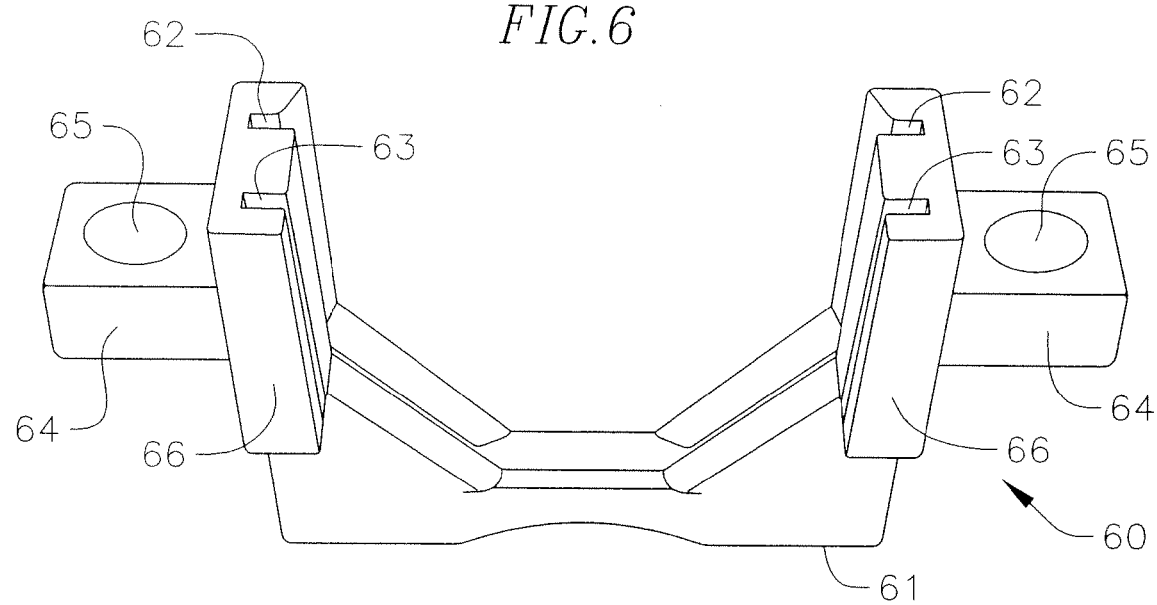
FIG. 6 is a side perspective view of a channel bracket according to one embodiment of the invention.
Figure 7:
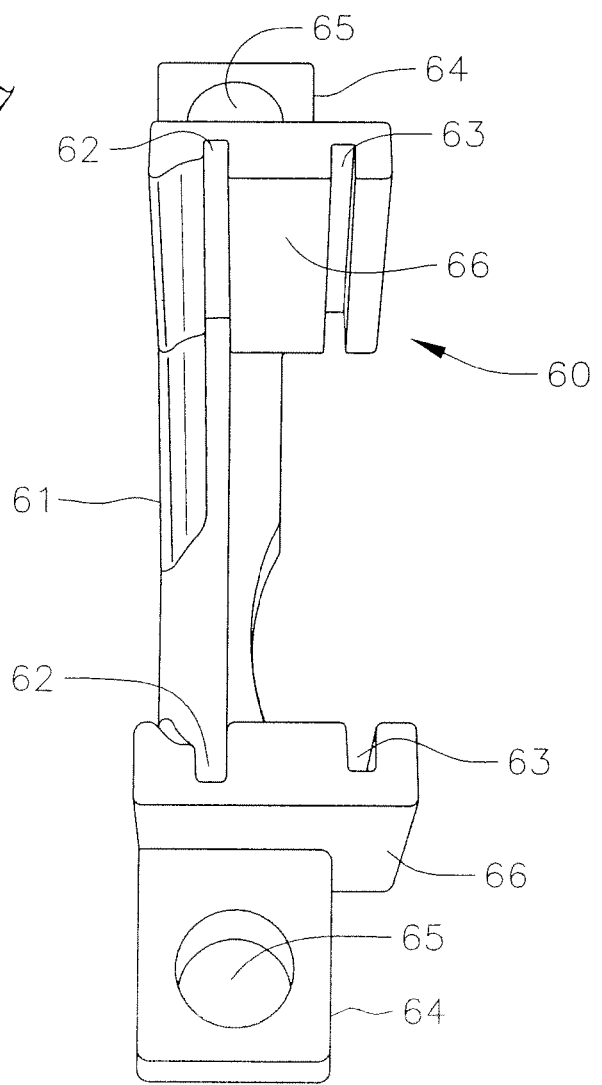
FIG. 7 is an overhead perspective view of a channel bracket according to one embodiment of the invention.
Figure 8:
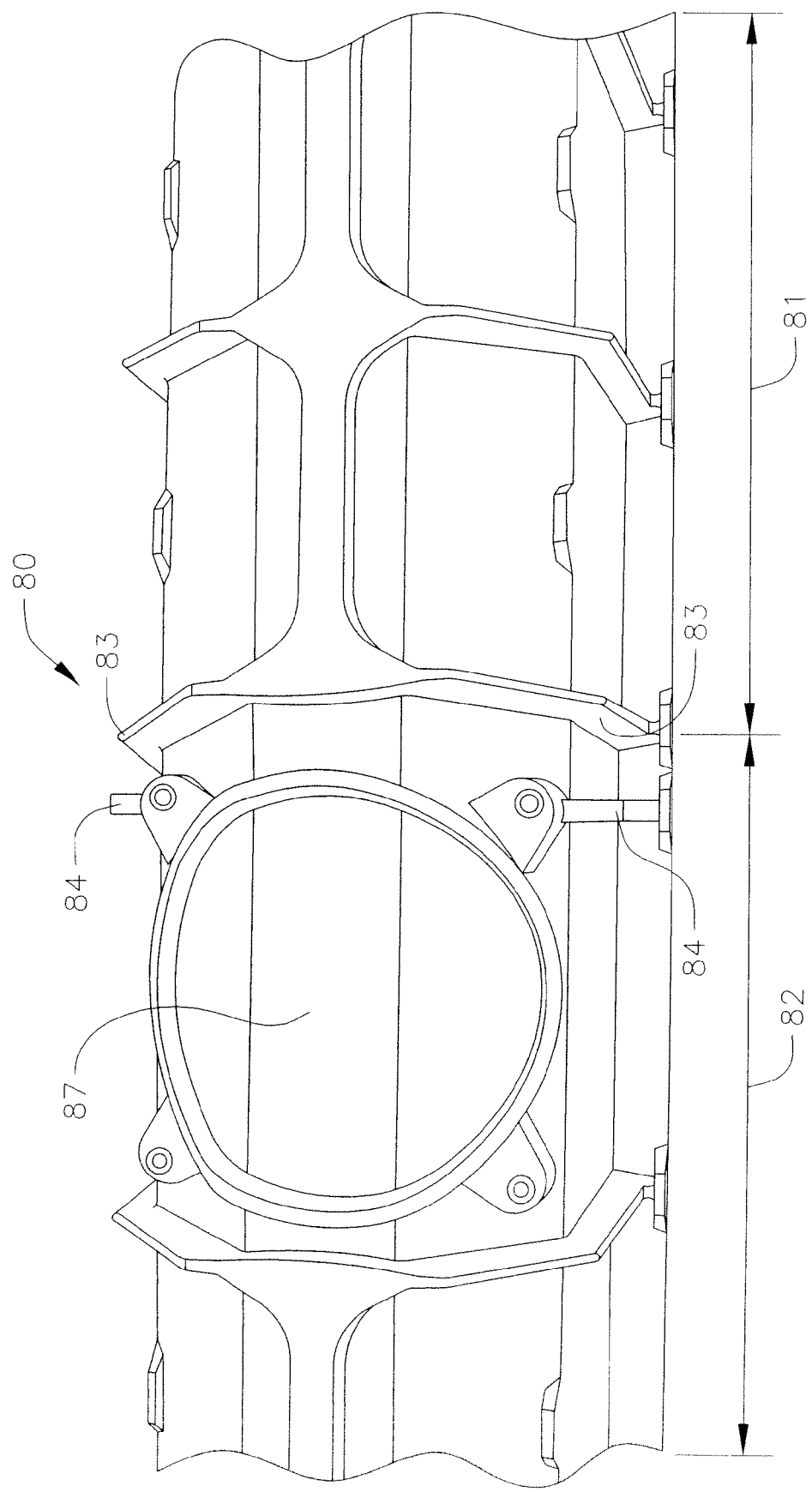
FIG. 8 is and overhead view of the underside of two sections of trench drain channel joined before adding a channel bracket according to one embodiment of the invention.

In an embodiment, as shown in FIGS. 6-9, different sections of the modular trench drain component are joined together with brackets to create longer sections of trench drain. Note that the sloping overlay rails are not shown in FIGS. 8 and 9 because the Figs. show the bottom portion of the trench drain system. As shown in FIG. 8, one section of modular trench drain channel 81 is joined to another section of trench drain channel 82. In an embodiment, trench drain channel 81 is the female end with a flange 83, and trench drain channel 82 is the male end with securing tabs 84. In one embodiment, trench drain channel 82 has a circular cutout 87 for a round discharge pipe (not shown).

According to one embodiment, to secure and assist in stabilizing the modular trench drain, channel brackets 60 are used as shown in FIGS. 6 and 7. In an embodiment, the channel bracket 60 comprises a base 61, connected to two side walls 66, and two anchor tabs 64 on the sidewalls 66. In one embodiment, each sidewall 66 has two grooves 62, 63, dimensioned to receive flanges 83 or securing tabs 84 located on modular trench channel sections as shown on FIG. 8. In another embodiment, only a portion of each sidewall is connected to the base 61, and one section containing one of the groves 63 is cantilevered from the base 61. One of the grooves 62 continues from the top of the clip down through the base 61 of the clip. The other groove 63 is only present on the cantilevered portion of the sidewall that is not connected to the base 61. In another embodiment, the anchor tabs 64 have two center holes 65 which are dimensioned to receive a piece of rebar (not shown).

Figure 9:
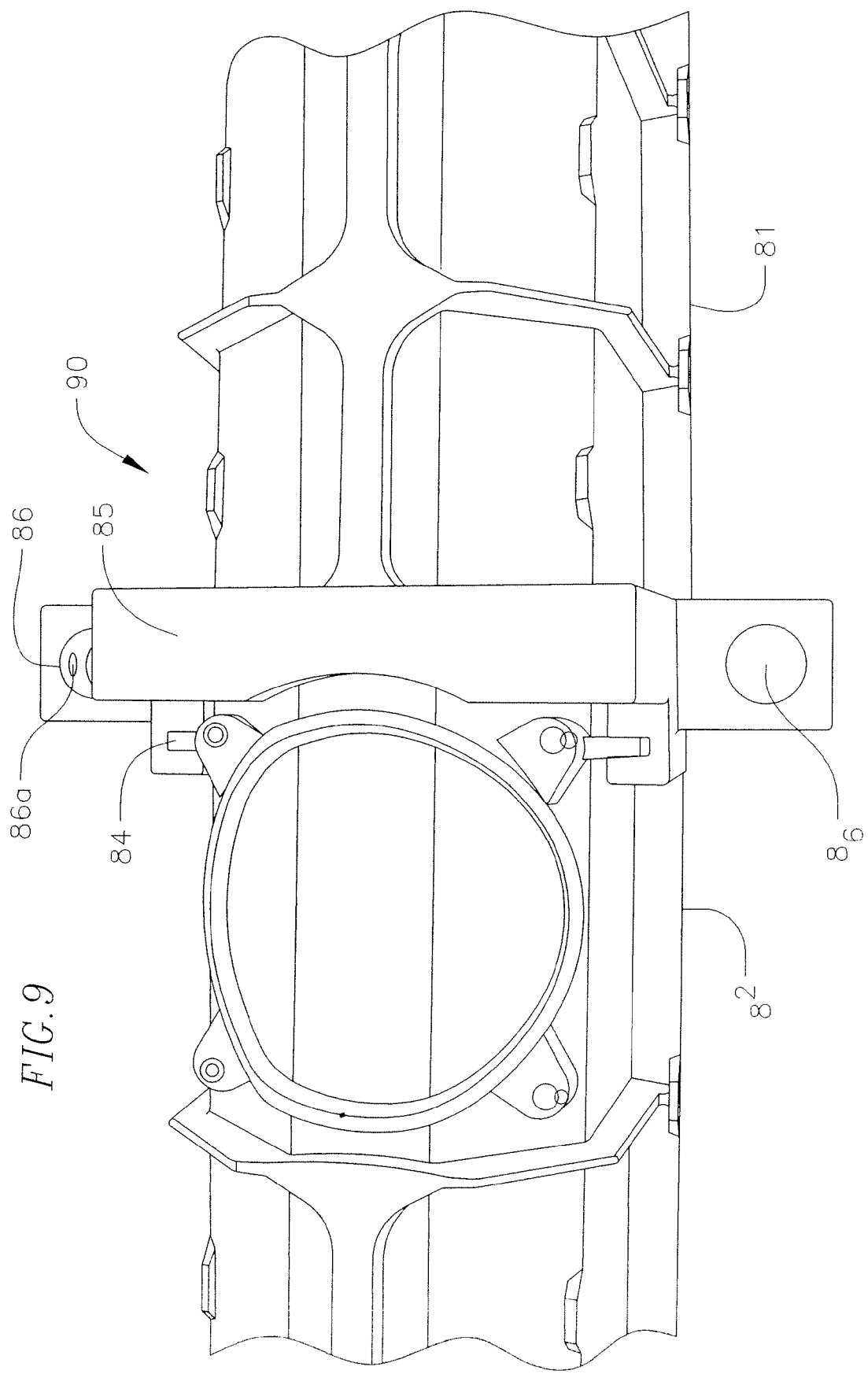
FIG. 9 is an overhead view of the underside of two sections of trench drain channel joined with a channel bracket according to one embodiment of the invention.
Figure 10B:
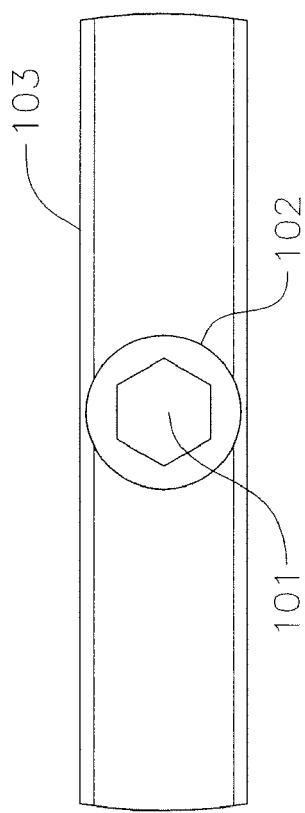
FIGS. 10 A-D show various views of the lock device for the grates according to one embodiment of the invention.
Figure 10A:
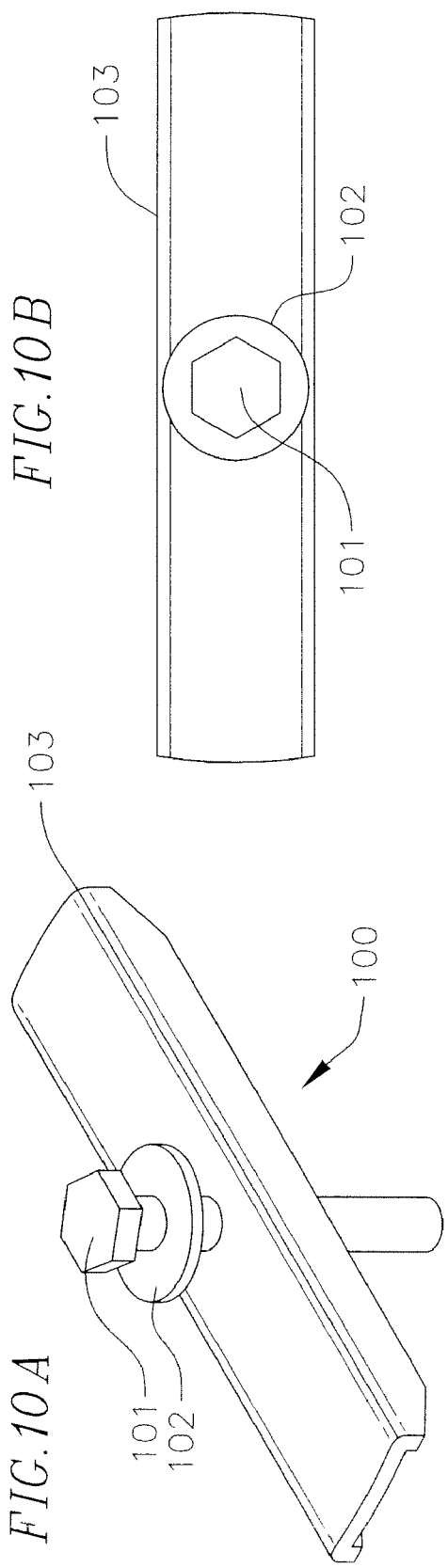
Figure 10D:
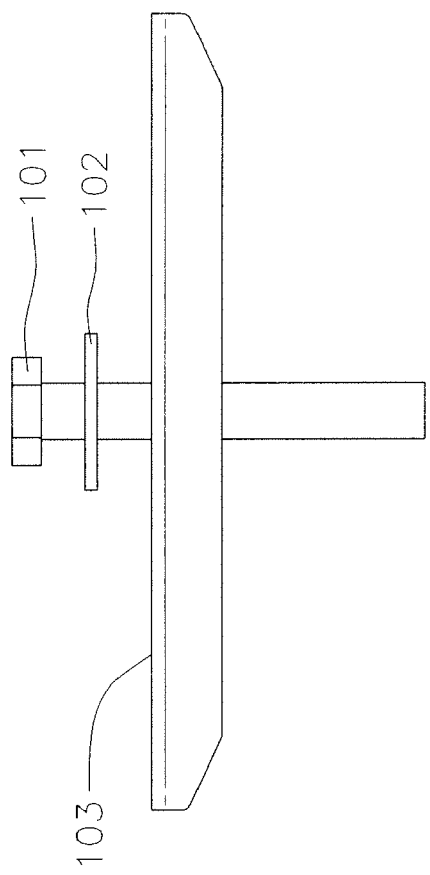
Figure 10C:
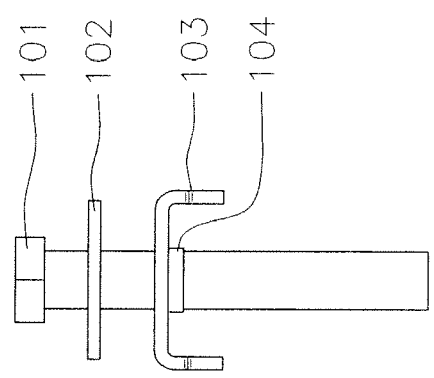

In an embodiment, as shown in FIG. 9, a channel bracket 85 is mounted over a flange (not shown) and a securing tab 84 to secure two sections of trench channel 81, 82 together. Center holes 86 may receive rebar (not shown) to anchor the secured sections prior to pouring the concrete, as well as after the concrete has cured. In addition to the vertical holes 86 for the rebar, a smaller horizontal hole 86a extends through the bracket 85. The hole 86a accepts a bolt (not shown) that is screwed in through the hole 86a to engage the rebar and lock it into place. The bolt extends perpendicular to the rebar. The smaller hole 86a is visible in FIG. 9 through the larger hole 86.

In one embodiment, as shown in FIGS. 10A-D, a locking device 100 is used to hold down slotted grates and solid covers and comprises a bolt 101, a washer 102, and a threaded flange 103. In another embodiment, the flange may be used in conjunction with the anchor clip 50 shown in FIG. 4B. The anchor clip 50 would be installed with the pins facing up, and the bolt 101 with a washer 102 would be inserted through a hole in the grating, like hole 33 in FIG. 5, and the flange 103 would be placed under the anchor clip 50, so that the bolt 101 may be inserted into the threads 104 of the flange 103 and tightened.

Various materials may be used for the different components of the trench drain system. In one embodiment, the channel is constructed of fiberglass, polypropylene, polyethylene, polymer concrete, concrete, or combinations thereof. In another embodiment, the overlay rails may be constructed of polypropylene, polyethylene, glass-reinforced polyester, or a combination thereof. In a further embodiment, the rails are constructed of the same material as the channel, fiberglass, polymer concrete, or combinations thereof. In one embodiment, the anchor clips may be constructed of PVC, plastic, steel, aluminum, and combinations thereof. In a further embodiment, polyurethane may be used as a sealer/adhesive between the channel sections, however any commonly known sealer in the art may be used. In an embodiment, the grating lock device is constructed out of stainless steel or galvanized steel, although other materials may be used for various parts such as plastics for the flange.

Another embodiment of the invention is shown in FIGS. 11-16. This embodiment may incorporate many of the same features described above, except where described differently below. In this embodiment, sloping overlay rails are again used to transform a non-sloping channel into a sloping trench drain system. Two overlay rails are connected to the top of a channel. The rails slope linearly from one end to the other. Each successive channel uses a different pair of rails that increase successively in height in order to create a progressively sloping trench drain. The rails include offset engaging portions that fit over the channel to secure the channel between the rail and the portions. In one embodiment the offset engaging portions comprise alternating tabs and walls. The rails also include a locking structure for locking the rail to the channel. In one embodiment, the locking structure includes a locking tab that engages a recess on the inside surface of the channel to lock the rail into place.

Figure 11:
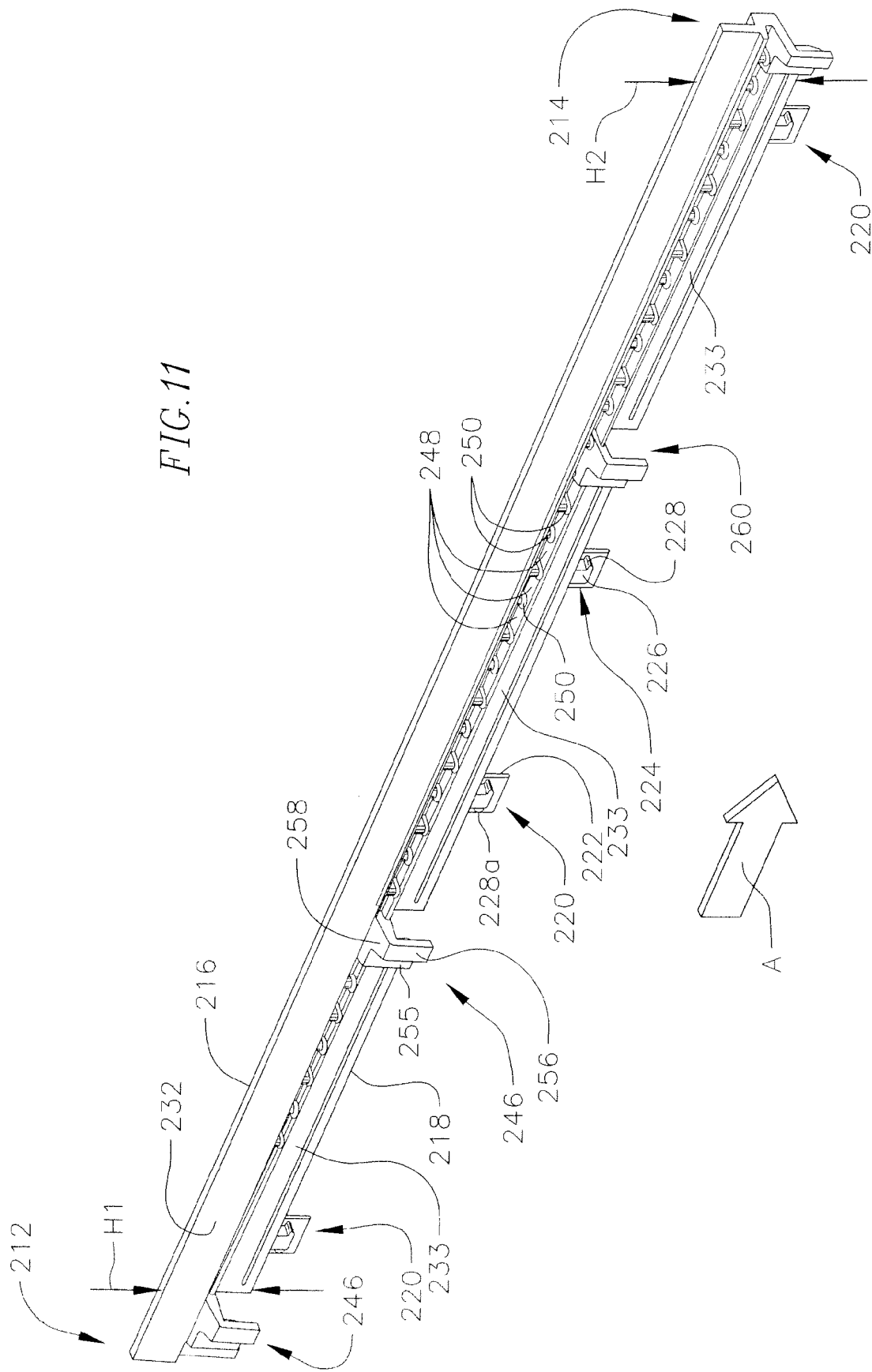
FIG. 11 is an outside perspective view of a sloping overlay rail according to another embodiment of the invention.
Figure 12:
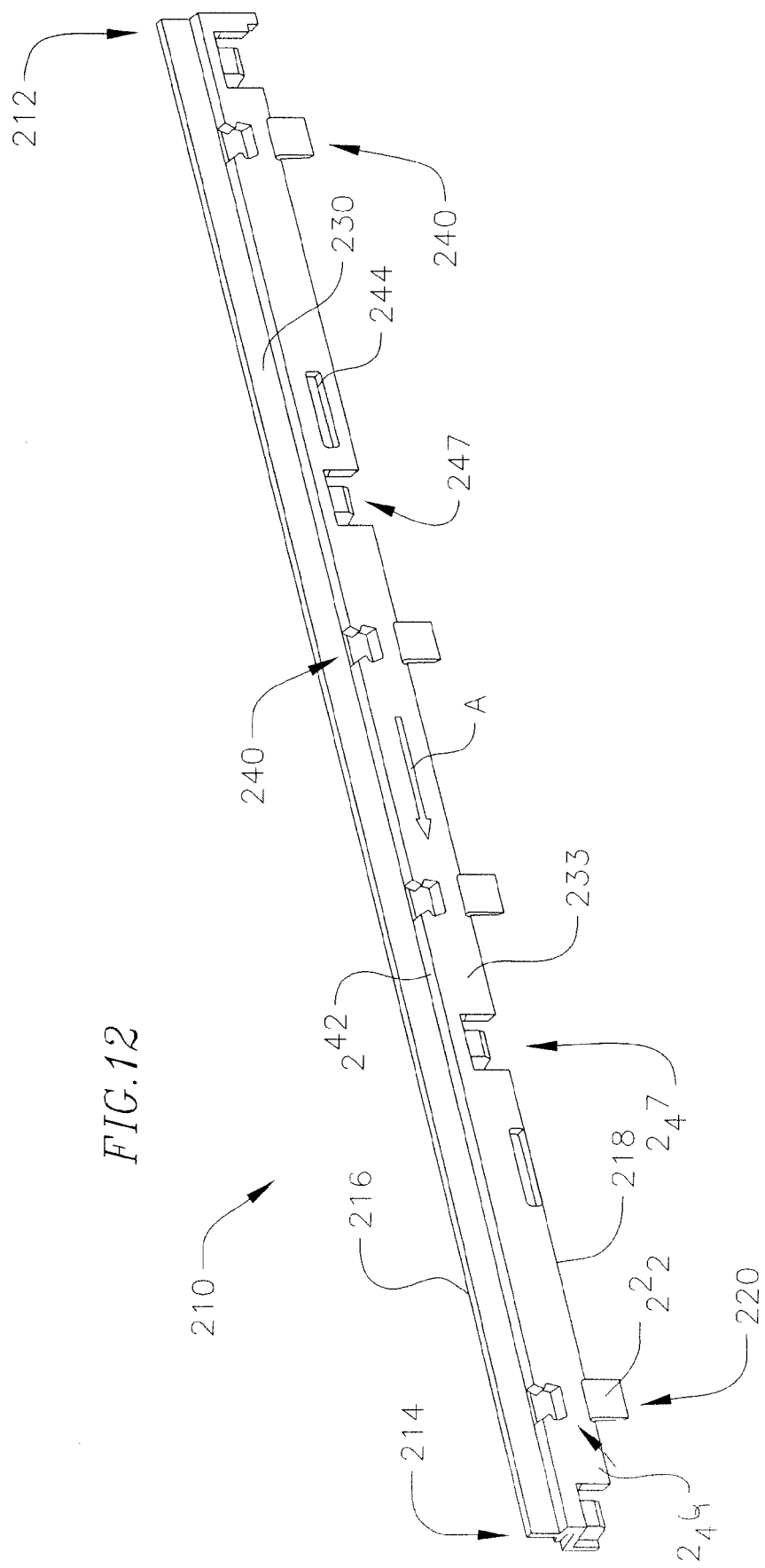
FIG. 12 is an inside perspective view of the sloping overlay rail of FIG. 11.

FIGS. 11 and 12 show inside and outside perspective views of a sloping overlay rail 210. The sloping overlay rail 210 slopes linearly from a distal end 212 to a proximal end 214. That is, as shown in FIG. 11, the height from a top edge 216 of the rail to a bottom edge 218 increases linearly from height H1 at the distal end 212 to a greater height H2 at the proximal end 214. The rail 210 is attached to the top of side wall 321 of channel 320, shown in FIG. 13, and a mirror-image rail is attached to the opposite side wall. When the two sloping rails are attached to the channel, they create a sloping trench drain that slopes in the direction of arrow A in FIGS. 11 and 12. Thus, liquid flowing through the trench drain will flow in the direction of arrow A. The slope is typically but not necessarily a linear slope from one end of the rail to the other. In one embodiment the rail increases in height at a constant rate between 0.40% and 1.00%, and in another embodiment it increases in height at a rate of about 0.5%.

The upper wall 360 of the channel is inserted between the lower wall 233 of the rail 210 and the first or "anchor" tabs 246 that extend from the outside surface 232 of the rail. In one embodiment, the lower wall 233 and anchor tabs 246 are staggered, as shown in FIGS. 11 and 12. This staggered configuration allows the rail to be manufactured from a sheet of material formed into a shape in a press, as described in further detail below.

The rail 210 is secured to the channel 320 by fitting the rail over the channel's upper wall 360. The upper wall 360 of the channel extends above an inner shelf 323. The bottom edge 218 of the rail rests on the inner shelf 323 of the channel. The upper wall 360 of the channel fits between the anchor tabs 246 and the lower wall 233 of the rail. In the embodiment shown, the lower wall 233 is divided by gaps that separate it into a plurality of lower wall portions. The anchor tabs 246 and lower wall portions 233 work together to secure the rail to the channel so that the rail cannot be moved laterally away from the channel (although it can still be slid along the length of the channel, as described more below). Thus, the anchor tabs act as a first, outside engagement portion that engage the outside surface of the channel, and the lower wall 233 acts as a second, inside engagement portion that engages the inside surface of the channel. Together, they trap the upper wall 360 of the channel between them.

Figure 14:
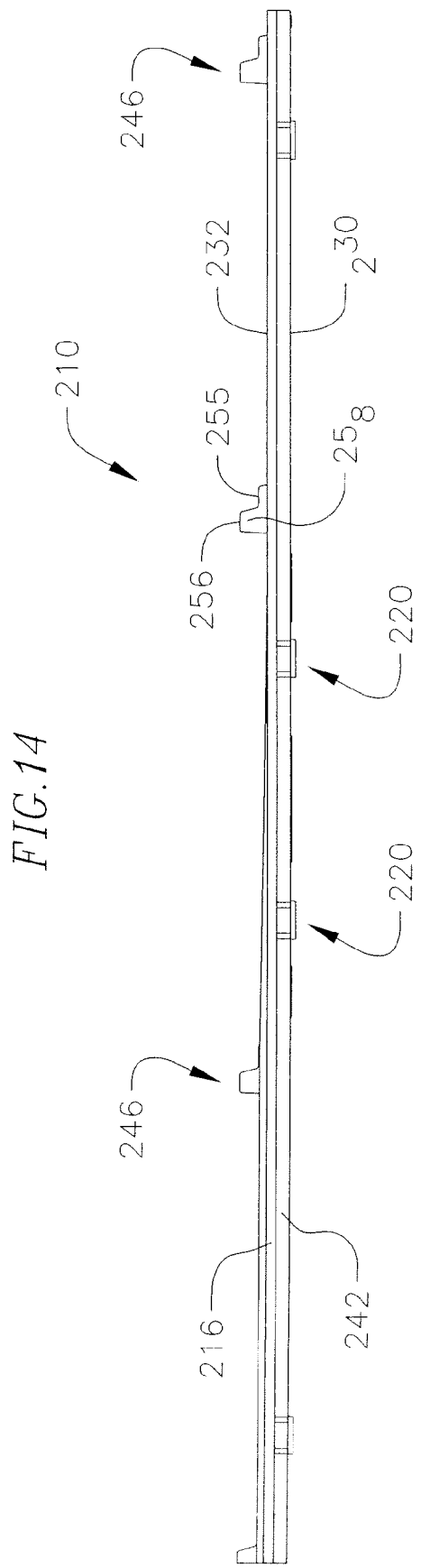
FIG. 14 is a top view of the sloping overlay rail of FIG. 11.

The anchor tabs 246 extend out from the outside surface 232 of the rail, as shown in FIG. 14. The anchor tabs 246 include two different portions or legs 255, 256, one extending out from the rail farther than the other. The first and second legs 255, 256 extend down from a top segment 258. In one embodiment the legs are parallel with the lower wall 233. Both legs extend out to create a space 260 between the legs and the lower wall 233 of the rail. In the embodiment shown, the first leg 255 is closer to the lower wall 233 than the second leg 256 is, as the top segment 258 extends the second leg 256 further away from the lower wall 233. Of course, the particular construction shown in FIG. 11 is not required, and in other embodiments the anchor tab may include just one leg instead of two, or may include two legs offset in different arrangements.

The first leg 255 engages the outer surface of the upper wall 360 of the channel, securing the upper wall 360 between the first leg 255 and the lower wall 233. The first leg 255 is spaced away from the lower wall 233 of the rail by enough distance to allow the upper wall 360 of the channel to fit along the lower wall 233 inside the first leg 255 of each anchor tab 246. The upper wall 360 is held snugly between the first leg 255 of the anchor tabs 246 and the lower wall 233.

The second leg 256 is used to firmly secure the rail into the trench when concrete is poured around the rail in the trench. The assembled trench drain, formed by the channel 320 and sloping rails 210, is typically placed into a trench and encased in concrete. In addition to securing the rail to the channel, the anchor tabs 246 provide additional reinforcement of the rails into the concrete. When the concrete is poured around the trench, it will flow around the anchor tabs 246, including around and under the second legs 256, which are spaced apart from the rail 210 by the upper segment 258 of the anchor tab. When the concrete sets around the anchor tabs 246, they prevent the trench drain from being easily removed from the concrete trench, thereby helping to anchor the trench drain in place inside the concrete. The concrete flows into the space between the second legs 256 and the upper wall 360 of the channel (which is fitted between the first legs 255 and the wall 233). The second legs 256 thereby further anchor the rail into the concrete, making it more difficult to remove. The anchor clips shown in FIG. 4B need not be used in this embodiment, although they certainly can be used if desired.

Figure 15:
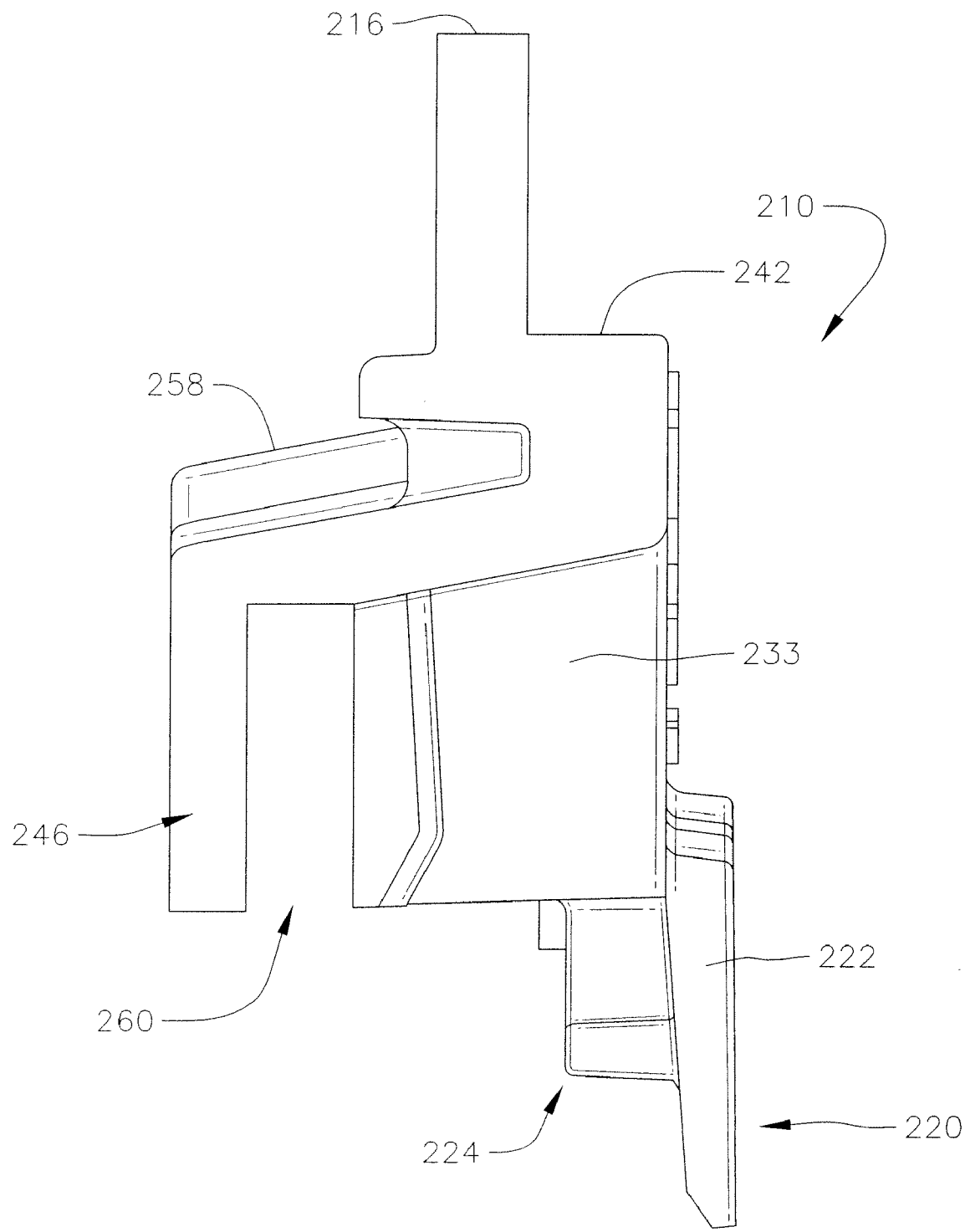
FIG. 15 is a front elevational view of the sloping overlay rail of FIG. 11.

The rail 210 also includes a locking structure for locking the rail to the channel. In one embodiment, the locking structure includes a second or "locking" tab 220 that extends down from the bottom edge 218 of the rail, as shown in FIGS. 11, 12, and 15. The locking tab 220 includes a backing plate or cover plate 222 with a connector 224 formed on one side of the plate. The connector 224 includes a raised protrusion or projection on the plate 222, formed in the shape of a knob 226 with a hook 228 on one end.

Figure 13:
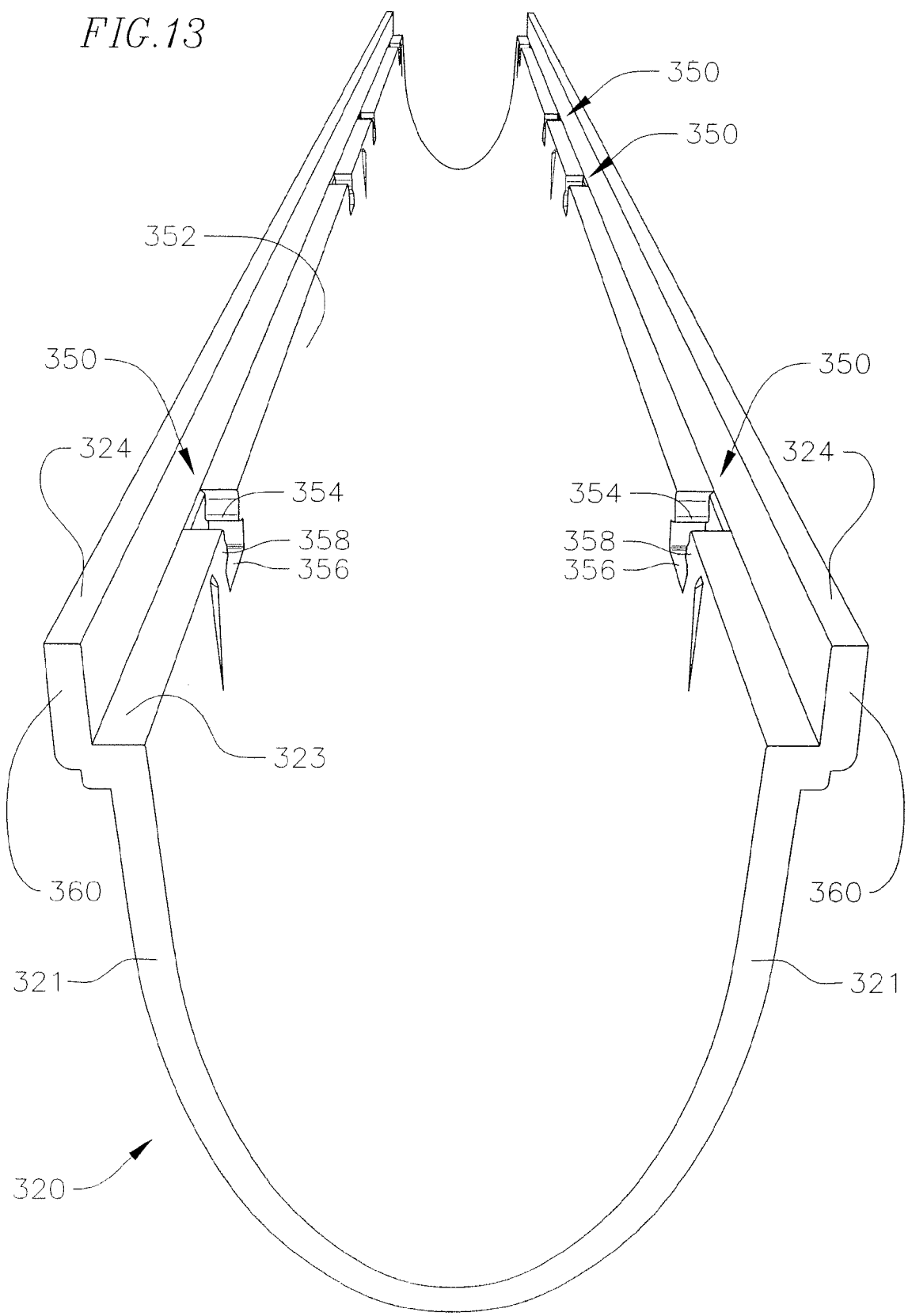
FIG. 13 is a front perspective view of a trench drain channel for use with the sloping overlay rail of FIG. 11.

The locking tab 220 is designed to engage a corresponding recess 350 on the inside surface of the side wall 321 of the channel 320, shown in FIG. 13. When the rail 210 is attached to the channel 320, the bottom edge 218 of the rail rests on the inner shelf 323 of the channel, with the locking tab 220 extending down below the inner shelf 323 into the recesses 350.

The recesses 350 are formed on the inside surface 352 of the channel, below the inner shelf 323. The recesses 350 are dimensioned to receive the connector 224 on the locking tab 220. The recesses 350 are shaped with a narrower neck portion 354 at the top, opening into a larger cavity 356 below the neck. The wider cavity 356 creates a shoulder 358 where the recess 350 narrows into the neck portion 354.

The locking tabs 220 and recesses 350 align when the rail 210 is placed on the channel 320. The rail 210 is attached to the channel 320 by pressing the knob 226 and hook 228 down into the recess 350 through the neck 354 at the top of the recess. The entire rail 210 is then translated a small distance along the length of the channel to move the hook 228 into the cavity 356 and under the shoulder 358. The hook 228 engages the shoulder 358 to lock the rail in place. The shoulder 358 and hook 228 prevent the rail 210 from being pulled upwardly out of engagement with the channel. In one embodiment, the rail is translated approximately ⅛ inch to move the hook under the shoulder. When the rail 210 is engaged to the recesses 350 in the channel 320, the backing plate 222 covers the recesses 350 and connector 224 on the inside of the channel.

In one embodiment, one of the locking tabs 220 includes a connector with a double hook 228a, as shown in FIG. 11. This particular locking tab snaps into place in the recess 350 once the rail is translated along the length of the channel to move the hooks 228 under the shoulders 358. Once the rail has been moved this short distance along the channel, the double hook 228a snaps into place in its corresponding recess 350. The second hook 228a may be a shallower or shorter projection than the main connector 224 with the one hook 228. This feature further secures the rail to the channel.

In another embodiment, shown in FIG. 16, the locking structure comprises a locking tab 220' that is separate from the rail 210', rather than being integrally connected. The separate locking tab 220' works in much the same way as the locking tab 220, engaging the shoulder 358 of the recess 350 to lock the rail 210' to the channel 320. In the embodiment shown, the locking tab 220' has two hooks 228', one on each end. First the rail 210' is fitted into place on top of the channel, with the recess 240' in the rail aligned over the recess 350 in the channel. In this embodiment, the recess 240' has a screw hole 270 through the bottom of the recess 240'. The separate locking tab 220' also has a screw hole 272 that extends down into the locking tab 220' from the top. When the rail 210' is in place on the channel, the locking tab 220' is inserted into the recess 350 in the channel. A screw is then inserted through the holes 270 and 272 and tightened, to secure the locking tab 220' to the rail 210'. With the locking tab 220' secured to the rail 210', the rail 210' cannot be lifted upwardly away from the channel. The locking tab 220' locks the rail in place.

In another embodiment, the locking structure comprises a locking tab with a rotatable hook or cam member that is rotated into engagement with the shoulder 358 once the tab has been inserted into the recess 350 in the channel. The locking tab includes a hook portion that is rotated or cammed inwardly under the shoulder 358 to lock the tab to the channel. As will be apparent to those skilled in the art, many other types of mechanical locks may be used to lock the rail to the channel.

The locking tabs 220, anchor tabs 246, and lower wall 233 secure the rail 210 to the channel 320. Once the rail 210 has been translated along the length of the channel to move the hook 228 below the shoulder 358, the hook prevents the rail from being moved upwardly away from the channel. The first legs 255 of the anchor tabs 246 and the lower wall portions 233 engage the channel on either side of the upper wall 360 to prevent the rail from being moved away from the channel. However, if the rail needs to be removed from the channel, the rail can be translated back to release the hook 228 from the shoulder, and then the rail can be lifted, bringing the connector 224 out of the recess 350 and bringing the upper wall 360 of the channel out of the space between the legs 255 and lower wall 233.

When the rail is clipped onto the channel, the bottom edge 218 of the rail 210 sits on the inner shelf 323 of the channel 320. An adhesive or bonding agent may be applied between the inner shelf 323 and the bottom edge 218 of the rail in order to further secure the two together. Optionally, the adhesive can permanently secure the rail to the channel. Before the locking tabs 220 are locked into the recesses 350, the adhesive or bonding agent is applied along the inner shelf 323 and/or the bottom edge 218 of the rail. The rail is then attached to the channel by locking the locking tabs 220 into the recesses. Once the adhesive or bonding agent fully sets, it helps secure the rail to the channel. In one embodiment, the adhesive used is a polymer sealant.

As shown in FIG. 12, the rail 210 may include a ledge 242 for receiving a grate or other cover that extends over the top of the channel. The ledge 242 is formed as a shelf on the inside surface 230 of the rail 210. The ledge 242 is even with the top edge 216 of the rail along the length of the rail. That is, the distance between the ledge 242 and top edge 216 of the rail is constant, even though the total height of the rail increases toward the proximal end 214. The ledge 242 provides a level resting place for the grate, so that the grate can be level with the top of the trench when the drain is installed.

In one embodiment, the inside surface 230 of the rail includes a recess 240 just below the ledge 242 for accepting a grate. The recess 240 has a shape similar to recess 350 on the channel 320, including a narrower neck portion above a wider cavity. The rail includes several recesses 240 spaced along the length of the rail. A grate with a corresponding connector can be attached to the recesses 240. For example, the grate may include a flexible connector that passes through the narrow neck portion of the recess 240 and then expands into the wider cavity portion so that the connector cannot be easily removed from the recess. The connector can be a simple snap-fit connector. The grate extends across the open top end of the channel 320 and rests on the ledges 242 on the two rails on opposite sides of the channel. The grate covers the open top end of the channel to block debris from entering the channel and to enable traffic to pass over the channel, such as when the trench is located in a road or sidewalk. However, the recesses 240 are optional, and the sloping rail 210 may be used without recesses 240.

In one embodiment, the recesses 240 are provided directly above the locking tabs 220 and are dimensioned the same as the recesses 350 in the channel. The recesses 240 can thereby receive a grate that was designed to fit into the recesses 350 in the channel. For example, the channel 320 can be designed to operate in a non-sloped trench drain without any rails. A grate can then be attached directly to recesses 350 on the channel to cover the open top end of the channel. Alternatively, when rails are used 210, the locking tabs 220 occupy the recesses 350. A grate cannot be connected to these recesses. Thus, in one embodiment, the rail 210 includes recesses 240 above the locking tabs 220, at the same axial positions along the channel as the recesses 350 in the channel. By using the same locations, spacing, and dimensions, a grate that was designed to attach directly to the channel recesses 350 can be attached to the rail recesses 240. Of course, it is not required that the recesses 240 be provided directly above the locking tabs 220 or be the same dimension as the recesses 350. The arrangement of locking tabs 220 and recesses 240 may vary according to the type of channel or grate used and the method of connection (for example, the grate can be bolted to a crossbar rather than clipped into a recess).

In one embodiment, the rail 210 includes horizontal slots 244 spaced periodically along the inside surface 230 of the rail 210, as shown in FIG. 12. These slots 244 provide an alternative mechanism for attaching a grate to the channel. Cross bars can be inserted into these slots 244 so that the cross bars extend across the open top of the channel. A grate can be placed on top of the cross bars. The grate can be bolted onto the cross bar or otherwise attached to the rails or cross bars to hold the grate firmly in place.

The outside surface 232 of the rail also includes a series of indentations 248 along the length of the rail 210, just above the anchor tabs 246. The indentations are separated by short columns 250 that increase in height toward the proximal end 214 of the rail. The indentations and columns provide additional areas for the concrete that is poured around the rail to engage the rail and anchor it in place. When the concrete is poured around the channel in the trench, the concrete flows into the indentations between the columns along the length of the rail. The columns also provide a visual indicator of the increasing depth of the rail 210.

The rail 210 with locking tabs 220 has a unique advantage in that it can be manufactured from sheet molding compound (SMC) that is made from a glass-fiber reinforced polyester (GRP) and formed in a press. This material is referred to as SMC/GRP. In the prior art, many channel and rail systems (whether sloping or not) have been formed by injection molding. In the injection molding process, a pellet of GRP is fed into the injection molding machine where it is melted and then forced under very high pressure through a small nozzle into a mold. The material flows and sets into the mold, which is shaped in the form of the product being manufactured, such as a rail 11 or 210. Within a few minutes, the material has set and the product is released from the mold to cool.

In order to inject melted GRP through a small nozzle, the length of the glass fibers in the GRP pellets has to be relatively small. Longer glass fibers can clog the nozzle instead of flowing quickly through it. The strength of the GRP material depends on the length of the glass fibers embedded throughout the material, so injection molded GRP is not as strong as other types of GRP in which the fiber length is not limited by the need to inject the GRP through a small nozzle. However, a benefit of injection molding is that it can be done very quickly.

When GRP is produced from SMC, the glass fibers can be much longer than injection-molded GRP. The SMC/GRP material is formed into large sheets that mature over a period of 3-5 days. The slow process allows the glass fibers and the resin material to become fully absorbed into the sheets. A section of the material is then placed into a heated press. The material is formed into its final shape in the press under high pressure and heat (in one embodiment, approximately 150° C.). The press molds the material into the desired shape, such as the shape of rail 210. Because the SMC/GRP is fed into the press in sheet form, rather than being melted and sprayed through a small nozzle, the glass fibers in the SMC/GRP are longer than the fibers in injection GRP, and the resulting product is stronger. In one embodiment, the glass fibers in the SMC/GRP pressed product are approximately 2-4 inches long. In one embodiment, the SMC/GRP sheet is approximately ¼ inch thick.

The sloping rails 11, 12, 210 can all be made via injection molding. However, the rails 11, 12 (see FIG. 2) with the U-shaped groove 11c, 12c cannot be made with SMC/GRP pressing because the sheet cannot be pressed into an overlapping U shape. The press cannot fold the sheet over itself to create an overlapping shape, such as the U-shaped groove 11c, 12c, with one part of the material behind another part. Thus, the sloping rails 11, 12 cannot take advantage of the higher strength SMC/GRP pressing process. They are typically made with injection molding, which produces GRP material with a lower strength due to its shorter glass fibers. The sloping rail 210 can be made with an SMC/GRP press. A section of the SMC/GRP material is moved into place in the press, which presses the section into the shape of the rail. For example, the anchor tabs 246 are pressed out from the inside, creating gaps 247 in the lower wall 233 of the rail (see FIG. 12). These anchor tab gaps 247 are not a necessary element of the rail 210, but are simply a result of the pressing process. When the rail 210 is made via SMC pressing, the anchor tabs 246 are pressed out from the inside surface 230 of the rail, leaving behind the anchor tab gaps. However, the rail 210 could be made via injection molding, in which case the anchor tab gaps are not necessary.

When the rail 210 is formed into shape in an SMC/GRP press, the anchor tabs 246 are essentially formed from portions of the lower walls 233 which are pressed out from the wall to form the tabs. Thus, where the anchor tabs 246 are formed, there is a corresponding gap 247 in the lower wall 233. The result is a rail with anchor tabs 246 that are staggered or offset from the lower wall portions 233 between the gaps 247.

This staggered configuration enables the rail 210 to be formed in an SMC/GRP press, and still enables the rail to firmly engage the channel 320. The upper wall 360 of the channel fits between the anchor tabs 246 and the wall 233, specifically between the first inner leg 255 of the anchor tabs and the wall 233. In the embodiment shown, the lower wall portions 233 between the gaps 247 engage the channel along a larger surface area than does the first, inner leg 255 of the anchor tabs. Compared to the lower wall 233, the first leg 255 contacts the channel along a relatively short distance. The portion of the inner wall 233 extending between each anchor tab 246 contacts the inside surface of the upper wall 360 of the channel along a greater distance and surface area. The combination of the two offset engaging portions, the first leg 255 of the anchor tab and the lower wall portions 233, engage opposite sides of the channel to firmly secure the channel to the rail.

In one embodiment, a method of manufacturing a sloping rail is provided. The method includes providing a section of SMC/GRP, and moving it into a press. The SMC/GRP sheet may be folded or otherwise manipulated or prepared prior to moving it into the press, as is known in the industry. The material is then pressed into the form of the sloping rail 210. Several presses are used to make pairs of mirror-image rails with progressively greater heights. The newly pressed rails are allowed to cool, and then they are attached to opposite sides of a channel to create a sloping trench drain.

Thus, the rail 210 provides an advantage in that it can be manufactured with SMC/GRP in a press. Many channels such as channel 320 are formed from SMC/GRP. If the rails that attach to the SMC/GRP channel are made from a different material, such as injection-molded GRP, then the channel and attached rail have different material properties, including different coefficients of thermal expansion. During the lifetime of the trench drain, the channel and rail are exposed to fluctuations in temperature, such as freezes during winter and heat in the summer. The materials expand and contract at different rates, causing the bond between them to stress and potentially fail.

However, when the rails 210 and channel are both made out of SMC/GRP material, then the channel and rail have the same material properties. They expand and contract together, thereby significantly reducing stress along their boundary. This can significantly increase the lifetime of the trench drain.

While this invention has been described in connection with what are considered to be exemplary embodiments, it is to be understood that the invention is not limited to the disclosed embodiments, dimensions, and configurations but, on the contrary, also extends to various modifications and equivalent arrangements. The invention is limited only by the claims and their equivalents.

What is claimed is:

1. An overlay rail for a trench drain channel with an upper wall, comprising:
   a proximal end and a distal end;
   a top edge and a bottom edge;
   an inside surface and an outside surface; and
   a channel engagement portion comprising alternating first and second engagement portions, the first engagement portion being spaced apart from the second engagement portion a distance sufficient to receive an upper wall of such a channel between the first and second engagement portions with such upper wall capable of engaging both the first and second engagement portions,
   wherein the first engagement portion comprises a plurality of downwardly-extending legs,
   wherein the second engagement portion comprises a wall comprising a plurality of openings passing through the wall,
   wherein the downwardly-extending legs are positioned opposite the openings, such that each leg faces one of the opening through the wall, and
   wherein a height from the top edge to the bottom edge increases from the distal end to the proximal end.

2. The overlay rail of claim 1, wherein the first engagement portion comprises a plurality of tabs extending from the outside surface of the rail, wherein each tab comprises one of the legs of the plurality of downwardly extending legs.

3. The overlay rail of claim 2, wherein each tab comprises two legs, one extending a greater distance from the outside surface of the rail than the other.

4. The overlay rail of claim 1, wherein each tab comprises a leg extends extending parallel to the wall to receive such channel between the leg and the wall.

5. The overlay rail of claim 4, wherein the wall has a length, as measured from the proximal end of the rail toward the distal end, that is greater than a length of the leg.

6. The overlay rail of claim 1, further comprising a locking structure for locking the rail to the channel.

7. The overlay rail of claim 6, wherein the locking structure comprises a locking tab extending from the bottom edge of the rail, the locking tab comprising a connector dimensioned to engage such channel to lock the rail to such channel.

8. The overlay rail of claim 7, wherein the connector comprises a hook.

9. The overlay rail of claim 1, further comprising a ledge on the inside surface of the rail.

10. The overlay rail of claim 9, wherein a height between the ledge and the top edge of the rail is constant between the proximal end and the distal end of the rail.

11. The overlay rail of claim 1, further comprising a recess on the inside surface of the rail for engagement with a grate.

12. The overlay rail of claim 11, wherein the recess comprises a narrow neck portion above a wider cavity.

13. The overlay rail of claim 1, wherein the rail is devoid of overlapping portions spaced apart from each other, in a direction from the inside surface of the rail to the outside surface of the rail.

14. The overlay rail of claim 1, wherein any axis oriented perpendicularly to the inside surface of the rail and passing from the inside surface of the rail to the outside surface of the rail encounters the rail only once, without passing through a space between portions of the rail.

15. A trench drain system comprising:
    a channel having first and second sidewalls;
    first and second overlay rails, each rail comprising:
    a top edge and a bottom edge;
    a proximal end and a distal end, wherein a height of the rail between the top edge and the bottom edge slopes from the proximal end to the distal end;
    an inner engagement portion engaging an inside surface of the respective first or second sidewall; and
    an outer engagement portion spaced apart from the inner engagement portion and engaging an outside surface of the respective sidewall,
    wherein a portion of each sidewall is received between the inner and outer engagement portions to attach the rail to the channel, and wherein the inner and outer engagement portions are staggered.

16. The trench drain system of claim 15, wherein the inner engagement portion comprises a wall and wherein the outer engagement portion comprises a tab spaced apart from the wall and extending from an outside surface of the rail to form a space between the tab and the wall for receiving the portion of the sidewall of the channel.

17. The trench drain system of claim 15, wherein each rail further comprises a locking structure for locking the rail to the channel.

18. The trench drain system of claim 17, wherein the locking structure comprises a locking tab comprising a connector that engages a corresponding recess on an inside surface of the channel.

19. The trench drain system of claim 18, wherein the recess comprises a narrow neck portion above a wider cavity, and a shoulder where the recess widens into the cavity, and wherein the connector comprises a hook dimensioned to engage the shoulder to lock the rail to the channel.

20. The trench drain system of claim 15, wherein each rail further comprises a ledge on an inside surface of the rail.

21. The trench drain system of claim 20, further comprising a grate resting on the ledge and extending across the channel.

22. The trench drain system of claim 21, wherein each rail further comprises a recess on the inside surface of the rail below the ledge, and wherein the grate comprises a connector engaging the recess in each rail to secure the grate to the rail.

23. The trench drain system of claim 15, wherein each of the first and second overlay rails is devoid of overlapping portions spaced apart from each other, in a direction from an inside surface of the rail to an outside surface of the rail.

24. The trench drain system of claim 23, wherein the outer engagement portion comprises a plurality of tabs, and wherein the rail comprises an opening through the rail opposite each tab.

25. The trench drain system of claim 15, wherein the channel has a width between the first and second sidewalls, and wherein the first and second overlay rails are separate from each other for use with the channel regardless of said width.

26. The overlay rail of claim 15, wherein any axis oriented perpendicularly to the inside surface of the rail and passing from the inside surface of the rail to the outside surface of the rail encounters the rail only once, without passing through a space between portions of the rail.

27. The overlay rail of claim 15, wherein the outer engagement portion comprises a plurality of downwardly-extending legs, wherein the inner engagement portion comprises a wall comprising a plurality of openings passing through the wall, and wherein the downwardly-extending legs are positioned opposite the openings, such that each leg faces one of the openings through the wall.

28. An overlay rail for a trench drain channel, comprising:
a proximal end and a distal end;
a top edge and a bottom edge;
an inside surface and an outside surface; and
a channel engagement portion comprising alternating first and second engagement portions, the first engagement portion being spaced apart from the second engagement portion a distance sufficient to receive such channel between the first and second engagement portions,
wherein a height from the top edge to the bottom edge increases from the distal end to the proximal end,
further comprising a locking structure for locking the rail to the channel, wherein the locking structure comprises a locking tab extending from the bottom edge of the rail, the locking tab comprising a connector dimensioned to engage such channel to lock the rail to such channel, and wherein the connector comprises a hook.

* * * * *

UNITED STATES PATENT AND TRADEMARK OFFICE
CERTIFICATE OF CORRECTION

| | | |
|---|---|---|
| PATENT NO. | : 8,322,944 B2 | Page 1 of 1 |
| APPLICATION NO. | : 12/258232 | |
| DATED | : December 4, 2012 | |
| INVENTOR(S) | : Hodgekins et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 464 days.

Signed and Sealed this
Eleventh Day of November, 2014

Michelle K. Lee
*Deputy Director of the United States Patent and Trademark Office*